United States Patent
Yamashita et al.

(10) Patent No.: US 11,486,860 B2
(45) Date of Patent: Nov. 1, 2022

(54) INSPECTION APPARATUS, METHOD AND PROGRAM OF CONTROLLING INSPECTION APPARATUS

(71) Applicant: NEC CORPORATION, Tokyo (JP)

(72) Inventors: Toshiaki Yamashita, Tokyo (JP); Michitaro Shozawa, Tokyo (JP); Satoshi Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 16/498,610

(22) PCT Filed: Mar. 30, 2018

(86) PCT No.: PCT/JP2018/013703
§ 371 (c)(1),
(2) Date: Sep. 27, 2019

(87) PCT Pub. No.: WO2018/181931
PCT Pub. Date: Oct. 4, 2018

(65) Prior Publication Data
US 2021/0109066 A1    Apr. 15, 2021

(30) Foreign Application Priority Data
Mar. 31, 2017 (JP) .............................. JP2017-073041

(51) Int. Cl.
*G01N 29/22* (2006.01)
*G01N 29/04* (2006.01)
(Continued)

(52) U.S. Cl.
CPC ......... *G01N 29/225* (2013.01); *G01N 29/045* (2013.01); *G01N 29/12* (2013.01); *G01N 29/42* (2013.01); *G01N 29/449* (2013.01)

(58) Field of Classification Search
CPC .... G01N 29/225; G01N 29/045; G01N 29/12; G01N 29/42; G01N 29/449; G01N 2291/0232; G01N 29/04
See application file for complete search history.

(56) References Cited

U.S. PATENT DOCUMENTS

| 7,464,596 B2 | 12/2008 | Bui et al. |
| 7,640,810 B2 | 1/2010 | Kennedy et al. |

(Continued)

FOREIGN PATENT DOCUMENTS

| CN | 101632002 A | 1/2010 |
| CN | 106352910 A | 1/2017 |

(Continued)

OTHER PUBLICATIONS

NEC Corp, "Facilitating hammering test by means of autonomous flight drone", wisdom.nec.com, Mar. 28, 2017, https://wisdom.nec.com/ja/solutions/2017.

(Continued)

*Primary Examiner* — Xin Y Zhong
(74) *Attorney, Agent, or Firm* — Sughrue Mion, PLLC (57) ABSTRACT

An inspection apparatus comprises a chassis position/attitude estimator to estimate position/attitude information of a moving body and generate a chassis position/attitude estimation signal, a hammering tester hammer part error signal generator to generate a hammering tester hammer part error signal, a hammering tester hammer part position/attitude signal generator to generate a hammering tester hammer part position/attitude signal, a first sensor data frequency characteristic interpolator to generate a first sensor data frequency characteristic interpolation signal from the received chassis position/attitude estimation signal, a second sensor data frequency characteristic interpolator to generate a second sensor data frequency characteristic interpolation signal from the received hammering tester hammer part error (Continued)

signal and the received hammering tester hammer part position/attitude signal, and a hammering tester hammer part position/attitude estimator to generate a hammering tester hammer part position/attitude estimation signal from the received first sensor data frequency characteristic interpolation signal and the received second sensor data frequency characteristic interpolation signal.

20 Claims, 5 Drawing Sheets

(51) Int. Cl.
*G01N 29/12* (2006.01)
*G01N 29/42* (2006.01)
*G01N 29/44* (2006.01)

(56) References Cited

U.S. PATENT DOCUMENTS

| | | |
|---|---|---|
| 7,640,811 B2 | 1/2010 | Kennedy et al. |
| 7,690,259 B2 | 4/2010 | Bui et al. |
| 9,605,926 B1 | 3/2017 | Means et al. |
| 2006/0243051 A1 | 11/2006 | Bui et al. |
| 2007/0006658 A1 | 1/2007 | Kennedy et al. |
| 2009/0064787 A1 | 3/2009 | Kennedy et al. |
| 2009/0133500 A1 | 5/2009 | Bui et al. |
| 2010/0131246 A1 | 5/2010 | Volker et al. |
| 2014/0150526 A1* | 6/2014 | Powers ............... G01N 29/045 73/12.09 |
| 2016/0011088 A1* | 1/2016 | Guthrie .................. G01N 3/48 73/12.13 |
| 2017/0016862 A1 | 1/2017 | Holmes et al. |
| 2017/0123060 A1 | 5/2017 | Yamashita |
| 2017/0276651 A1 | 9/2017 | Hall |
| 2917/0292841 | 10/2017 | Sabe et al. |

FOREIGN PATENT DOCUMENTS

| | | |
|---|---|---|
| CN | 106483196 A | 3/2017 |
| EP | 3392652 A1 | 10/2018 |
| JP | 2001-349876 A | 12/2001 |
| JP | 2002-303610 A | 10/2002 |
| JP | 2003-014711 A | 1/2003 |
| JP | 2004-205216 A | 7/2004 |
| JP | 3595492 B2 | 12/2004 |
| JP | 2012-145346 A | 8/2012 |
| JP | 2016-050876 A | 4/2016 |
| JP | 2016050802 A | 4/2016 |
| JP | 2016-173347 A | 9/2016 |
| JP | 2017-003306 A | 1/2017 |
| TW | I564557 B | 1/2017 |
| WO | 2015/162873 A1 | 10/2015 |
| WO | 2016/051148 A1 | 4/2016 |
| WO | 2016/059930 A1 | 4/2016 |
| WO | 2016/139930 A1 | 9/2016 |

OTHER PUBLICATIONS

Suzuki, Satoshi, "Autonomous Control of Multi-rotor Helicopter under GPS-denied Environment", Journal of The Society of Instrument and Control Engineers, Jan. 2017, pp. 18-23, vol. 56, No. 1.
Motonaka, K. et al., "Implementation and Basic Experiments of Kinodynamic Motion Planning for a Quadrotor", IECON2015—Yokohama, Nov. 9, 2015, pp. 2759-2764.
International Search Report of PCT/JP2018/013703 dated Jun. 19, 2018 [PCT/ISA/210].
Communication dated Aug. 3, 2020, from the Taiwanese Intellectual Property Office in application No. 107109831.
Japanese Office Action for JP Application No. 2020-181038 dated Nov. 2, 2021 with English Translation.
Chinese Office Action for CN Application No. 201880022746.9 dated Jul. 5, 2021 with English Translation.
Communication dated May 19, 2020, From the European Patent Office in application No. 18775515.2.
Communication dated Aug. 3, 2020, from the Taiwanese Intellectual Property Office in English application No. 107109831.
Japanese Office Action for JP Application No. 2020-181038 dated Aug. 23, 2022 with English Translation.

* cited by examiner

INSPECTION APPARATUS, METHOD AND PROGRAM OF CONTROLLING INSPECTION APPARATUS

CROSS-REFERENCE TO RELATED APPLICATIONS

This application is a National Stage of International Application No. PCT/JP2018/013703, filed Mar. 30, 2018, claiming priority from Japanese patent application No. 2017-073041 (filed on Mar. 31, 2017), and the entire disclosure of the application is incorporated herein by reference thereto.

FIELD

The present invention relates to an inspection apparatus, a method of controlling an inspection apparatus, and a program of controlling same.

BACKGROUND

One of methods of testing a damage, a deficit etc. of a testing object such as a bridge, a tunnel etc. is a hammering test in which a testing object is hit with a hammer etc. to confirm a hammering sound. Some techniques in relation to this hammering test are proposed.

Patent literature 1 discloses a system of detecting floating of an outer wall, having a detection device and a monitoring and handling apparatus which performs a remote control of the detection device. The detection device is mounted on a moving flight vehicle, and has a hammering tool, a moving flight vehicle control receiver, a sound collector, and a hammering sound transmitter. The monitoring and controlling apparatus has a moving flight vehicle control transmitter, a hammering sound receiver, and a speaker. An operator performs remote control of the moving flight vehicle, and hammers an outer wall of a building by means of the hammering tool.

Patent Literature 2 discloses a hammering test apparatus of a tunnel lining concrete, having a post provided in a vehicle traveling in an axial direction of a tunnel, and an arm attached to the upper end part of the post. At the remote end of the arm, a support plate is provided, and the support plate is provided with two rows of interval retaining wheels and one hammer arranged between the two rows of interval retaining wheels. This hammering test apparatus makes the two rows of interval retaining wheels contact with a surface of the tunnel lining concrete so as to follow its unevenness, thereby retaining a constant interval between the surface of the tunnel lining concrete and a hammering start position of the hammer.

Patent literature 3 discloses a structure hammering test apparatus having a test head which hammers and tests the surface of a structure, and head moving means which moves the test head while pressing it on a test area of the structure. This structure hammering test apparatus performs a hammering test of a predetermined test area in a series of continuous actions while moving an automatic travelling vehicle having the head moving means.

Patent literature 4 discloses a concrete soundness determination apparatus having a test robot which continuously travels and stops along a robot traveling rail. This determination apparatus intends to precisely collect hammering sound of a hammer by keeping a constant position of a microphone provided in the test robot, and at the same time, shorten a test time duration by making a sound receiving open end part contact with or separate from a concrete area only through a lifting or lowering operation of a measuring unit.

[PATENT LITERATURE 1] JP 2012-145346 A
[PATENT LITERATURE 2] JP 2004-205216 A
[PATENT LITERATURE 3] JP 3595492 B2
[PATENT LITERATURE 4] JP 2002-303610 A

SUMMARY

The following analysis is given according to the present disclosure.

In the outer wall floating detection system disclosed in Patent Literature 1, it is necessary that the operator performs remote control of the moving flight vehicle to guide it to an appropriate inspection location. Accordingly, the operator needs a skill in handling the moving flight vehicle. If the operator is unexperienced in the handling, the inspection operation costs unexpectedly much time, or cannot be performed successfully.

In the hammering test apparatus of tunnel lining concrete disclosed in Patent Literature 2, it is necessary to perform traveling of a vehicle such as a 2-ton truck on which this hammering test apparatus is mounted, thereby moving the hammering test apparatus of tunnel lining concrete. Hence, this hammering test apparatus cannot perform a hammering test on an inspection location positioned at a site the vehicle cannot approach.

In the structure hammering test apparatus disclosed in Patent Literature 3, the automatic travelling vehicle on which the inspection head and the head moving means are mounted is made to travel. Accordingly, this hammering test apparatus cannot perform a hammering test on an inspection location positioned at a site the automatic travelling vehicle cannot approach.

In the concrete soundness determination apparatus disclosed in Patent Literature 4, the automatic travelling vehicle on which the test robot is mounted is made to travel. Accordingly, this determination apparatus cannot perform a soundness determination for an inspection portion positioned at a site the automatic travelling vehicle cannot approach.

The present disclosure at least has a purpose to solve at least one of the above-mentioned problems.

According to a first aspect of the present disclosure, an inspection apparatus of inspecting an inspecting object is provided.

The inspection apparatus comprises a hammering tester and a moving body on which the hammering tester is mounted.

The hammering tester comprises a hammering tester arm and a hammering tester hammer part provided at a remote end of the hammering tester arm.

The inspection apparatus comprises:
  a chassis position/attitude estimator configured to estimate position/attitude information of the moving body and generate a chassis position/attitude estimation signal,
  a hammering tester hammer part error signal generator configured to generate a hammering tester hammer part error signal,
  a hammering tester hammer part position/attitude signal generator configured to generate a hammering tester hammer part position/attitude signal,
  a first sensor data frequency characteristic interpolator configured to receive the generated chassis position/attitude estimation signal, and generate a first sensor data frequency characteristic interpolation signal from the received chassis position/attitude estimation signal, a second sensor data frequency characteristic interpolator configured to receive the generated hammering tester hammer part error signal and the generated hammering tester hammer part position/attitude signal, and generate a second sensor data frequency characteristic interpolation signal from the received hammering tester hammer part error signal and the received hammering tester hammer part position/attitude signal, and a hammering tester hammer part position/attitude estimator configured to receive the generated first sensor data frequency characteristic interpolation signal and the generated second sensor data frequency characteristic interpolation signal and generate a hammering tester hammer part position/attitude estimation signal from the received first sensor data frequency characteristic interpolation signal and the received second sensor data frequency characteristic interpolation signal.

According to a second aspect of the present disclosure, provided is a method for controlling an inspection apparatus to inspect a state of an inspecting object, the apparatus comprising a hammering tester having a hammering tester arm and a hammering tester hammer part provided at a remote end of the hammering tester arm, and a moving body on which the hammering tester is mounted.

The control method comprises:

estimating position/attitude information of the moving body and generating a chassis position/attitude estimation signal, generating a hammering tester hammer part error signal, generating a hammering tester hammer part position/attitude signal, generating a first sensor data frequency characteristic interpolation signal from the generated chassis position/attitude estimation signal, generating a second sensor data frequency characteristic interpolation signal from the generated hammering tester hammer part error signal and the generated hammering tester hammer part position/attitude signal, and generating a hammering tester hammer part position/attitude estimation signal from the generated first sensor data frequency characteristic interpolation signal and the generated second sensor data frequency characteristic interpolation signal.

According to a third aspect of the present disclosure, provided is a computer readable non-transitory recording medium recording a program for controlling an inspection apparatus to inspect a state of an inspecting object, the apparatus comprising a hammering tester including a hammering tester arm and a hammering tester hammer part provided at a remote end of the hammering tester arm, and a moving body on which the hammering tester is mounted.

The control program makes a computer execute the following processing:

estimating position/attitude information of the moving body and generating a chassis position/attitude estimation signal, generating a hammering tester hammer part error signal, generating a hammering tester hammer part position/attitude signal, generating a first sensor data frequency characteristic interpolation signal from the generated chassis position/attitude estimation signal, generating a second sensor data frequency characteristic interpolation signal from the generated hammering tester hammer part error signal and the generated hammering tester hammer part position/attitude signal, and generating a hammering tester hammer part position/attitude estimation signal from the generated first sensor data frequency characteristic interpolation signal and the generated second sensor data frequency characteristic interpolation signal.

According to a fourth aspect of the present disclosure, an inspection apparatus for inspecting a state of an inspecting object is provided.

The inspection apparatus comprises a hammering tester and a moving body on which the hammering tester is mounted.

The hammering tester comprises a hammering tester arm and a hammering tester hammer part provided at a remote end of the hammering tester arm.

The inspection apparatus comprises:

means for estimating position/attitude information of the moving body and generating a chassis position/attitude estimation signal, means for generating a hammering tester hammer part error signal, means for generating a hammering tester hammer part position/attitude signal, means for receiving the generated chassis position/attitude estimation signal and generating a first sensor data frequency characteristic interpolation signal from the received chassis position/attitude estimation signal, means for receiving the generated hammering tester hammer part error signal and the generated hammering tester hammer part position/attitude signal and generating a second sensor data frequency characteristic interpolation signal from the received hammering tester hammer part error signal and the received hammering tester hammer part position/attitude signal, and means for receiving the generated first sensor data frequency characteristic interpolation signal and the generated second sensor data frequency characteristic interpolation signal and generating a hammering tester hammer part position/attitude estimation signal from the received first sensor data frequency characteristic interpolation signal and the received second sensor data frequency characteristic interpolation signal.

MODES

A summary of the present disclosure will be described in reference to FIG. 1 to FIG. 5. The reference numbers in the summary are added merely for better understanding of the summary with no intention to restrict same to the Examples shown in the Drawings.

Figure 5:
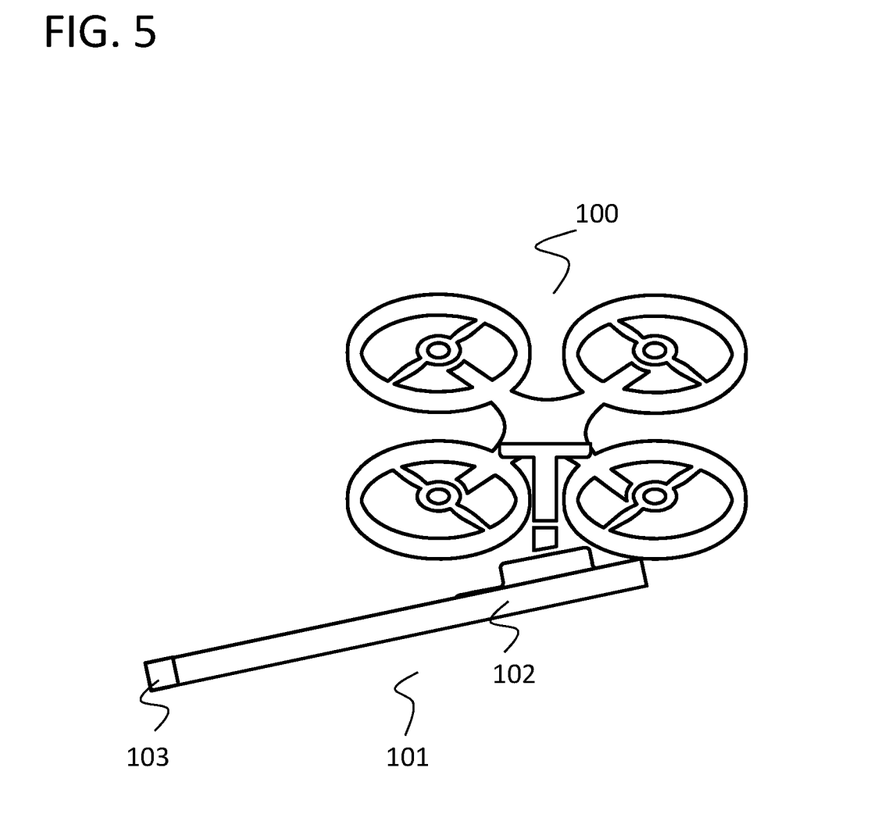
FIG. 5 an example of an inspection apparatus according to an example embodiment of the present disclosure.

An inspection apparatus, in general, is a moving body 100 on which a hammering tester 101 is mounted, which has a hammering tester arm 102 with a hammering tester hammer part 103 at its remote end (refer to FIG. 5). The inspection apparatus according to the present disclosure has, as a main part of its signal processing system, a chassis position/attitude estimator 1 to estimate position/attitude information of the moving body 100 and generate a chassis position/attitude estimation signal 20, a hammering tester hammer part error signal generator 2 to generate a hammering tester hammer part error signal 21, a hammering tester hammer part position/attitude signal generator 3 to generate a hammering tester hammer part position/attitude signal 22, a first sensor data frequency characteristic interpolator 4 to receive the generated chassis position/attitude estimation signal 20 and generate a first sensor data frequency characteristic interpolation signal 23 from the received chassis position/attitude estimation signal 20, a second sensor data frequency characteristic interpolator 5 to receive the generated hammering tester hammer part error signal 21 and the generated hammering tester hammer part position/attitude signal 22 and generate a second sensor data frequency characteristic interpolation signal 24 from the received hammering tester hammer part error signal 21 and the received hammering tester hammer part position/attitude signal 22, and a hammering tester hammer part position/attitude estimator 6 to receive the generated first sensor data frequency characteristic interpolation signal 23 and the generated second sensor data frequency characteristic interpolation signal 24 and generate a hammering tester hammer part position/attitude estimation signal 25 from the received first sensor data frequency characteristic interpolation signal 23 and the received second sensor data frequency characteristic interpolation signal 24 (refer to FIG. 1). It is to be noted that "chassis" mentioned herein means the chassis of the moving body 100.

Figure 1:
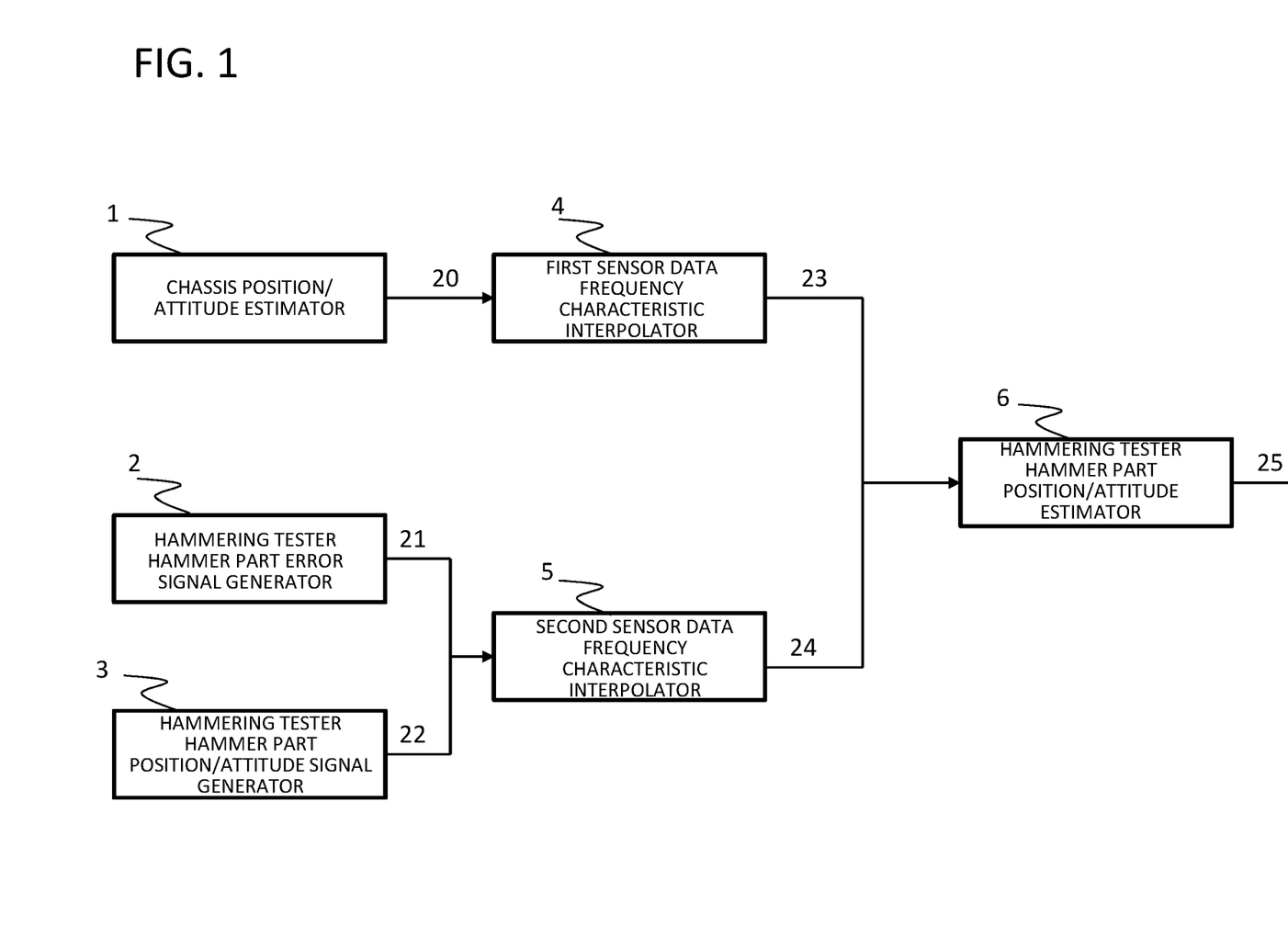
FIG. 1 a block diagram of a main portion of a signal processing system of an inspection apparatus according to an example embodiment of the present disclosure.

In the thus configured inspection apparatus, a hammering tester hammer part position/attitude estimation signal 25 is generated as follows. That is, a chassis position/attitude estimation signal 20 of the moving body 100 generated by the chassis position/attitude estimator 1 of the moving body 100 on which the hammering tester 101 is mounted is subjected to a weighted interpolation in consideration of a frequency characteristic of the chassis control system in the first sensor data frequency characteristic interpolator 4 which is configured with a low data sampling rate processing system, thereby generating a first sensor data frequency characteristic interpolation signal 23; a hammering tester hammer part error signal 21 and a hammering tester hammer part position/attitude signal 22 (both of which may be collectively referred to as a hammering tester hammer part relative error estimation signal) is subjected to a weighted interpolation in consideration of a frequency characteristic of the hammering tester control system in the second sensor data frequency characteristic interpolator 5 which is configured with a high data sampling rate processing system, thereby generating a second sensor data frequency characteristic interpolation signal 24; the first sensor data frequency characteristic interpolation signal 23 and the second sensor data frequency characteristic interpolation signal 24 are combined in the hammering tester hammer part position/attitude estimator 6 to generate a hammering tester hammer part position/attitude estimation signal 25.

Accordingly, the present disclosure makes it possible to generate a hammering tester hammer part position/attitude estimation signal 25 in real time and with high accuracy, even if a sampling interval of a chassis position/attitude estimation signal 20 of the moving body 100 generated by the chassis position/attitude estimator 1 is relatively long and thus a frequency band and an accuracy obtained from the signal is physically limited, and as a result adjust position and/or attitude of the hammering tester hammer part 103 in real time and with high accuracy.

Further, according to the present disclosure, the hammering tester hammer part error signal generator 2 comprises a distance sensor 7 provided at a remote end of the hammering tester hammer part 103, a force sensor 8 provided in the hammering tester hammer part 103, and a remote end part position/attitude sensor 9 provided in the hammering tester hammer part 103. The distance sensor 7 detects a distance between the remote end of the hammering tester hammer part 103 and a surface of a hammering object and generates a distance sensor signal 26 from the detected distance. The force sensor 8 detects force information applied to the hammering tester hammer part, and generates a force sensor signal 27 from the detected force information. The remote end part position/attitude sensor 9 detects position/attitude information of the hammering tester hammer part 103, and generates a remote end part position/attitude sensor signal 28 from the detected position/attitude information. A hammering tester hammer part error signal 21 of the hammering tester hammer part error signal generator 2 is generated from the distance sensor signal 26, the force sensor signal 27 and the remote end part position/attitude sensor signal 28 (refer to FIG. 2).

Furthermore, according to the present disclosure, the hammering tester hammer part position/attitude signal generator 3 comprises a linear motion part displacement sensor 10 provided in a linear motion part of the hammering tester arm 102, a remote end part angle sensor 11 provided in a remote end part angle driving part of the hammering tester arm 102, and an arm part angle sensor 12 provided in an arm part angle driving part of the hammering tester arm 102. The linear motion part displacement sensor 10 detects displacement information of the linear motion part and generates a linear motion part displacement sensor signal 29 from the detected displacement information. The remote end part angle sensor 11 detects remote end part angle information, and generates a remote end part angle sensor signal 30 from the detected remote end part angle information. The arm part angle sensor 12 detects arm part angle information and generates an arm part angle sensor signal 31 from the detected arm part angle information. A hammering tester hammer part position/attitude signal 22 of the hammering tester hammer part position/attitude signal generator 3 is generated from the linear motion part displacement sensor signal 29, the remote end part angle sensor signal 30 and the arm part angle sensor signal 31 (refer to FIG. 3).

Figure 4:
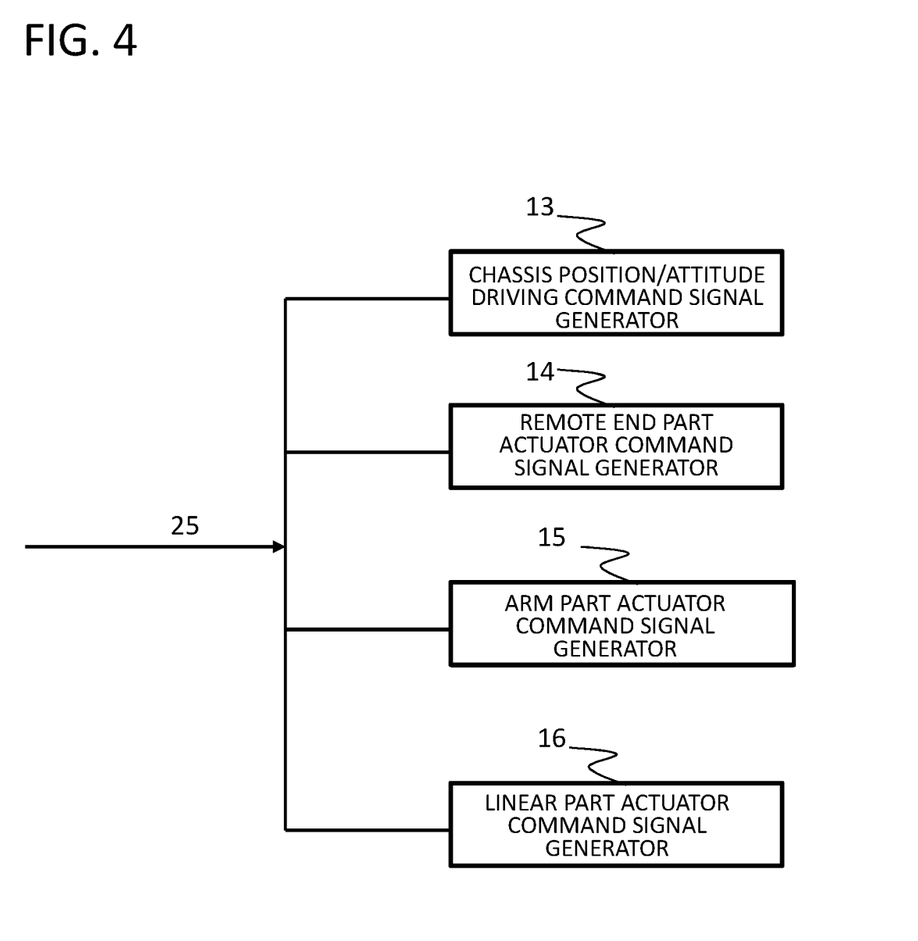
FIG. 4 a block diagram of a signal processing system for driving an inspection apparatus according to an example embodiment of the present disclosure.

Moreover, according to the present disclosure, the inspection apparatus comprises a chassis position/attitude driving command signal generator 13 to receive a generated hammering tester hammer part position/attitude estimation signal 25 and generate a chassis position/attitude driving command signal from the received hammering tester hammer part position/attitude estimation signal 25, a remote end part actuator command signal generator 14 to receive a generated hammering tester hammer part position/attitude estimation signal 25 and generate a remote end part actuator command signal from the received hammering tester hammer part position/attitude estimation signal 25, an arm part actuator command signal generator 15 to receive a generated hammering tester hammer part position/attitude estimation signal 25 and generate an arm part actuator command signal from the received hammering tester hammer part position/ attitude estimation signal 25, and a linear motion part actuator command signal generator 16 to receive a generated hammering tester hammer part position/attitude estimation signal 25 and generate a linear motion part actuator command signal from the received hammering tester hammer part position/attitude estimation signal 25 (refer to FIG. 4). The position and/or the attitude of the chassis of the moving body 100 is adjusted based on the chassis position/attitude driving command signal. On the other hand, the position and/or the attitude (or the orientation) of the hammering tester hammer part 103 is adjusted by driving the remote end part actuator, the arm part actuator and the linear motion part actuator of the hammering tester 101 based on the remote end part actuator command signal, the arm part actuator command signal and the linear motion part actuator command signal, respectively.

It is to be noted that the inspection apparatus according to the present disclosure is used in general to inspect a state of an inspecting object such as a bridge, a tunnel etc., particularly a deterioration state thereof such as a damage, a deficit etc. The moving body includes, but not restricted to, a flying vehicle such as a multirotor helicopter or drone. For example, the moving body may include a car (a ground traveling vehicle), too. Further, advantageously, the moving body may be a manned or unmanned type. Furthermore, an inspection system comprising an inspection apparatus and a communication apparatus which communicates the inspection apparatus by wire or wireless can be configured. The communication system has, for example, a function of sending, to the inspection apparatus, a command signal which commands the inspection apparatus to approach or separate from a target portion of an inspecting object, and a function of receiving image information taken by the inspection apparatus. In addition, the inspection apparatus may comprise an information processing apparatus which processes these signals or information.

Hereinafter a concrete example embodiment of the present disclosure will be explained in detail with reference to the Drawings. The reference numbers in the following example embodiment are added merely for better understanding thereof with no intention to restrict same to the modes shown in the Drawings.

FIG. 1 shows a block diagram of a main part of a signal processing of an inspection apparatus according to an example embodiment of the present disclosure. As shown in FIG. 5, in this example embodiment, the inspection apparatus is so configured as to comprise a hammering tester 101, and a moving body (vehicle) 100 on which the hammering tester 101 is mounted, wherein the hammering tester 101 is so configured as to comprise a hammering tester arm 102, and a hammering tester hammer part 103 provided at a remote (distal) end of the hammering tester art 102. The moving body 100 is a multirotor helicopter in this example embodiment.

As shown in FIG. 1, the inspection apparatus comprises a chassis position/attitude estimator 1, a hammering tester hammer part error signal generator 2, a hammering tester hammer part position/attitude signal generator 3, a first sensor data frequency characteristic interpolator 4, a second sensor data frequency characteristic interpolator 5, and a hammering tester hammer part position/attitude estimator 6.

Figure 2:
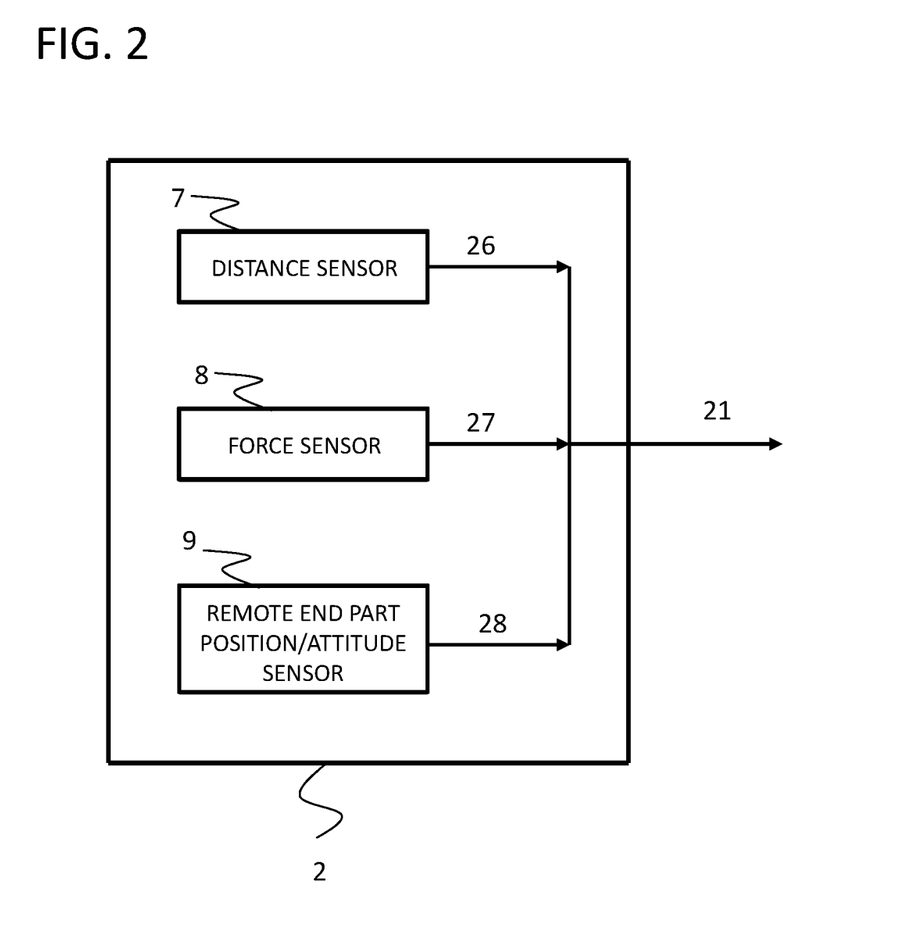
FIG. 2 a block diagram of the hammering tester hammer part error signal generator shown in FIG. 1.

FIG. 2 is a block diagram of the hammering tester hammer part error signal generator 2 shown in FIG. 1. As shown, the hammering tester hammer part error signal generator 2 is so configured as to comprise a distance sensor 7, a force sensor 8, and a remote end part position/attitude sensor 9. The distance sensor 7 is provided at the remote end of the hammering tester hammer part 103, detects a distance between the remote end of the hammering tester hammer part 103 and the surface of a hammered object, and generates a distance signal 26 from the detected distance. The force sensor 8 is provided in the hammering tester hammer part 103, detects force information applied to the hammering tester hammer part 103, and generates a force sensor signal 27 from the detected force information. The remote end part position/attitude sensor 9 is provided in the hammering tester hammer part 103, detects position/attitude information of the hammering tester hammer part 103, and generates a remote end part position/attitude sensor signal 28 from the detected position/attitude information. The hammering tester hammer part error signal generator 2 generates a hammering tester hammer part error signal 21 from the distance signal 26, the force sensor signal 27, and the remote end part position/attitude sensor signal 28.

Figure 3:
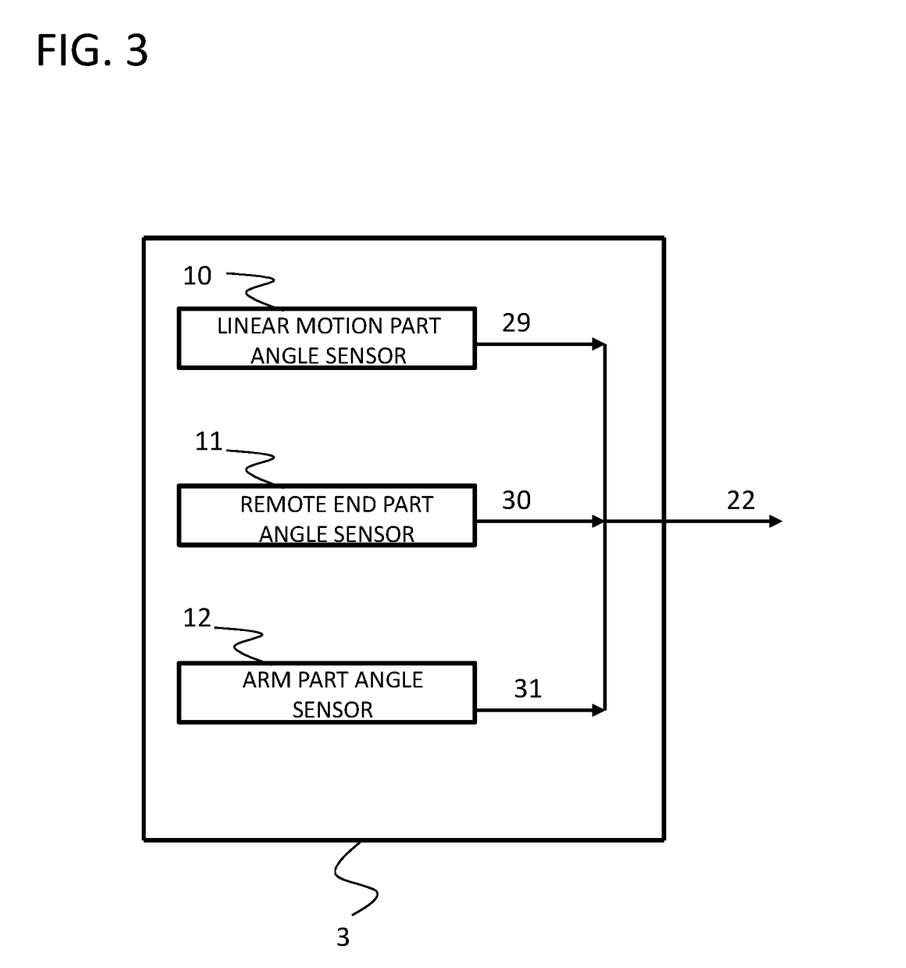
FIG. 3 a block diagram of the hammering tester hammer part position/attitude signal generator shown in FIG. 1.

FIG. 3 is a block diagram of the hammering tester hammer part position/attitude signal generator 3 shown in FIG. 1. As shown, the hammering tester hammer part position/attitude signal generator 3 is so configured as to comprise a linear motion part displacement sensor 10, a remote end part angle sensor 11 and an arm part angle sensor 12. The linear motion part displacement sensor 10 is provided in a linear motion part of the hammering tester arm 102, detects displacement of the linear motion part, and generates a linear motion part displacement sensor signal 29 from the detected displacement information. The remote end part angle sensor 11 is provided in a remote end part angle driving part of the hammering tester arm 102, detects remote end part angle information, and generates a remote end part angle sensor signal 30 from the detected remote end part angle information. The arm part angle sensor 12 is provided in an arm part angle driving part of the hammering tester arm 102, detects arm part angle information, and generates an arm part angle sensor signal 31 from the detected arm part angle information. The hammering tester hammer part position/attitude signal generator 3 generates a hammering tester hammer part position/attitude signal 22 from the linear motion part displacement sensor signal 29, the remote end part angle sensor signal 30 and the arm part angle sensor signal 31.

The hammering tester hammer part position/attitude estimator 6 generates a hammering tester hammer part position/attitude estimation signal 25 from a first sensor data frequency characteristic interpolation signal 23 and a second sensor data frequency characteristic interpolation signal 24, wherein the signal 23 is generated by the first sensor data frequency characteristic interpolator 4 from a chassis position/attitude estimation signal 20 detected in the chassis position/attitude estimator 1, and the signal 24 is generated by the second sensor data frequency characteristic interpolator 5 from a hammering tester hammer part error signal 21 by the hammering tester hammer part error signal generator 2 and a hammering tester hammer part position/attitude signal 22 by the hammering tester hammer part position/attitude signal generator 3.

FIG. 4 is a block diagram of a signal processing system for driving an inspection apparatus according to an example embodiment of the present disclosure. The inspection apparatus comprises a chassis position/attitude driving command signal generator 13, a remote end part actuator command signal generator 14, an arm part actuator command signal generator 15 and a linear motion part actuator command signal generator 16. The chassis position/attitude driving command signal generator 13 receives the hammering tester hammer part position/attitude estimation signal 25 and generates a chassis position/attitude driving command signal from the received hammering tester hammer part position/attitude estimation signal 25.

The remote end part actuator command signal generator 14 receives the hammering tester hammer part position/attitude estimation signal 25 and generates a remote end part actuator command signal from the received hammering tester hammer part position/attitude estimation signal 25. The arm part actuator command signal generator 15 receives the hammering tester hammer part position/attitude estimation signal 25 and generates an arm part actuator command signal from the received hammering tester hammer part position/attitude estimation signal 25. The linear motion part actuator command signal generator 16 receives the hammering tester hammer part position/attitude estimation signal 25 and generates a linear motion part actuator command signal from the received hammering tester hammer part position/attitude estimation signal 25.

The position and/or the attitude of the chassis of the moving body 100 is adjusted based on the chassis position/attitude driving command signal. On the other hand, the position and/or the attitude (or orientation) of the hammering tester hammer part 103 is adjusted by driving the remote end part actuator, the arm part actuator and the linear motion part actuator of the hammering tester 101 based on the remote end part actuator command signal, the arm part actuator command signal and the linear motion part actuator command signal, respectively.

The following explains a case where position/attitude information of the hammering tester hammer part 102 provided at a remote end of the hammering tester 101 is estimated with a high sampling frequency of 1 kHz and generated.

First, in order to highly accurately reproduce a behavior of the chassis obtained by a chassis control band set to about 2 Hz, the first sensor data frequency characteristic interpolator 4 simultaneously performs a frequency band limitation emphasis filter (bandpass filter/window function) processing which emphasizes a frequency characteristic signal of around 2 Hz and a data interpolation processing to a chassis position/attitude estimation signal 20 that the chassis position/attitude estimator 1 generates with a sampling frequency of at most 10 Hz. As a result, the first sensor data frequency characteristic interpolator 4 generates a first sensor data frequency characteristic interpolation signal 23 capable of corresponding to an estimation signal of a high sampling frequency of 1 kHz, obtained as position/attitude information of the hammering tester hammer part 103.

In order to derive the estimation signal of the high sampling frequency of 1 kHz from the chassis position/attitude estimation signal 20 that can be obtained only with the sampling frequency of at most 10 Hz at this time, the following processing is performed.

A chassis speed and a chassis angular speed contained in the chassis position/attitude estimation signal 20 are set to $^{f}s_k$ and $^{f}\omega_k$, respectively. Further, from a chassis position and a chassis attitude $^{f}r_k$ and $^{f}\theta_k$, a system state quantity and an error covariance matrix are set to $^{f}x_k=[^{f}r_k^T\ ^{f}\theta_k^T]^T$ and $^{f}P_k$, respectively. And based on a linear probability system (a state space model):

$$\begin{cases} ^{f}x_{k+1} = {}^{f}\Phi_k{}^{f}x_k + {}^{f}G_k{}^{f}w_k + {}^{f}D_k{}^{f}u_k \\ ^{f}z_k = {}^{f}H_k{}^{f}\theta_k + {}^{f}v_k \end{cases} \quad (1)$$

($^{f}\Phi_k$ is a state transition matrix, $^{f}G_k$ is a driving noise matrix, $^{f}D_k$ is a driving input matrix, $^{f}H_k$ is an observation matrix, $^{f}u_k$ is $^{f}u_k=[^{f}s_k^T\ ^{f}\omega_n^T]^T$, and $^{0}z_k$ is an observation signal), the first sensor data frequency characteristic interpolator 4 uses the following formulas to generate an attitude predictive value/error covariance value signal by a predictive value to a system state quantity $^{0}x_{k+1}^-$ and an error covariance matrix predictive value $^{0}P_{k+1}^-$.

$$^{f}x_{k+1}^- = {}^{f}\Phi_k{}^{f}x_k^+ + {}^{f}D_k{}^{f}u_k \quad (2)$$

$$^{f}P_{k+1}^- = {}^{f}\Phi_k{}^{f}P_k^+{}^{f}\Phi_k^T + {}^{f}G_k{}^{f}Q_k{}^{f}G_k^T \quad (3)$$

In the above formulas, the superscript "+" indicates an estimation value after a Kalman filter processing, the superscript "−" a propagation predictive value before a Kalman filter processing, the superscript "T" a transposed matrix, and the subscript "k" the order of observation time-series. A system noise $^{f}w_k$ and an observation noise $^{f}v_k$ are assumed to be white noises independent of each other, and $^{f}Q_k$ indicates a covariance matrix (design parameters set by a Kalman filter designer in accordance with dynamic characteristics of a flying object) of the system noise $^{f}w_k$.

Moreover, the first sensor data frequency characteristic interpolator 4 regards the position/attitude contained in the chassis position/attitude estimation signal 20 as an update value of a Kalman filter for the formula (1), and uses a subscript "n" to describe the order of observation time-series by "n" for observation at this (current) time and "n+1" for observation at a next time. The interpolator 4 performs this Kalman filter update processing by using the following formulas (4), (5) and (6).

$$^{f}K_n = {}^{f}P_n^-{}^{f}H_n({}^{f}H_n^T{}^{f}P_n^-{}^{f}H_n + {}^{f}R_n)^{-1} \quad (4)$$

$$^{f}x_n^+ = {}^{f}x_n^- + {}^{f}K_n(^{f}z_n - {}^{f}H_n^T{}^{f}x_n^-) \quad (5)$$

$$^{f}P_n^+ = {}^{f}P_n^- - {}^{f}K_n{}^{f}H_n^T{}^{f}P_n^- \quad (6)$$

In the foregoing, $^{f}R_n$ is a covariance matrix (design parameters set in accordance with gyro characteristics applied by a hypothetical Kalman filter designer) of an observation noise $^{f}v_n$, and the superscript "−1" indicates an inverse matrix.

From the above results, finally, the chassis position/attitude estimation interpolation data obtained by the formulas (2) and (5) from the first sensor data frequency characteristic interpolator 4 is generated as a first sensor data frequency characteristic interpolation signal 23.

Next, in order to make it possible to highly accurately estimate a behavior of the hammering tester which operates in a hammering tester control band set to about 30 Hz, the second sensor data frequency characteristic interpolator 5 simultaneously performs a frequency emphasis filter (bandpass filter/window function) processing which performs weighting of a signal obtained from frequency components centered at around 30 Hz and a data interpolation processing to a remote end part position/attitude signal which is obtained from the hammering tester hammer part error signal 21 and the hammering tester hammer part position/attitude signal 22 with a sampling frequency of 1 kHz. As a result, the second sensor data frequency characteristic interpolator 5 generates a second sensor data frequency characteristic interpolation signal 24.

Then, the hammering tester hammer part position/attitude estimator 6 combines the first sensor data frequency characteristic interpolation signal 23 with the second sensor data frequency characteristic interpolation signal 24, thereby making it possible to generate a hammering tester hammer part position/attitude estimation signal 25 with sampling frequencies of 1 kHz and 10 Hz. The first sensor data frequency characteristic interpolation signal 23 is a position/attitude estimation signal of the chassis generated as an equivalent of 1 kHz sampling frequency by subjecting, in the first sensor data frequency characteristic interpolator 4, the chassis position/attitude estimation signal 20 to an emphasis processing by frequency weighting based on a control band of chassis position/attitude behavior and concurrently to a data interpolation processing. The second sensor data frequency characteristic interpolation signal 24 is a position/attitude signal of the remote end of the hammering tester hammer part obtained by subjecting signals generated from the hammering tester hammer part error signal generator 2 which generates an error signal of the hammering tester hammer part 103 with 1 kHz sampling frequency and from the hammering tester hammer part position/attitude signal generator 3 which generates a position/attitude signal of the hammering tester hammer part 103 with 1 kHz sampling frequency to an emphasis processing by frequency weighting based on hammering tester control band and concurrently to a data interpolation processing.

Hence, according to this example embodiment, an optimal combination of data obtained from the chassis position/attitude estimator 1, the hammering tester hammer part error signal generator 2 and the hammering tester hammer part position/attitude signal generator 3 which are different from one another in sampling frequency and control characteristic can be easily achieved by using together the first sensor data frequency characteristic interpolator 4 and the second sensor data frequency characteristic interpolator 5. Accordingly, estimation of hammering tester hammer part position/attitude by the hammering tester hammer part position/attitude estimator 6 is an appropriate processing in the form close to an ideal condition. As a result, the hammering tester hammer part position/attitude estimation according to this example embodiment further increases in accuracy in comparison with a mere data interpolation processing.

The interpolation processings in the first sensor data frequency characteristic interpolator 4 and in the second sensor data frequency characteristic interpolator 5 as described herein are unique technologies configured in combination of the filtering processing and the data interpolation processing, realized as results obtained by appropriately evaluating dynamic characteristics of the chassis and the hammering tester hammer, respectively, as control frequency characteristics by their respective control systems.

Therefore, those processings provide particularly remarkable effects unexpected from a mere combination of previously known arts.

Hereinafter, preferred modes of the present invention disclosed in this Description and the Drawings are mentioned as supplementary notes.

[Mode 1]

An inspection apparatus for inspecting a state of an inspecting object, comprising:
 a hammering tester and a moving body on which the hammering tester is mounted,
 the hammering tester comprising a hammering tester arm and a hammering tester hammer part provided at a remote end of the hammering tester arm,
 the inspection apparatus comprising:
 a chassis position/attitude estimator to estimate position/attitude information of the moving body and generate a chassis position/attitude estimation signal,
 a hammering tester hammer part error signal generator to generate a hammering tester hammer part error signal,
 a hammering tester hammer part position/attitude signal generator to generate a hammering tester hammer part position/attitude signal,
 a first sensor data frequency characteristic interpolator to receive the generated chassis position/attitude estimation signal and generate a first sensor data frequency characteristic interpolation signal from the received chassis position/attitude estimation signal,
 a second sensor data frequency characteristic interpolator to receive the generated hammering tester hammer part error signal and the generated hammering tester hammer part position/attitude signal and generate a second sensor data frequency characteristic interpolation signal from the received hammering tester hammer part error signal and the received hammering tester hammer part position/attitude signal, and
 a hammering tester hammer part position/attitude estimator to receive the generated first sensor data frequency characteristic interpolation signal and the generated second sensor data frequency characteristic interpolation signal and generate a hammering tester hammer part position/attitude estimation signal from the received first sensor data frequency characteristic interpolation signal and the received second sensor data frequency characteristic interpolation signal.

[Mode 2]

The inspection apparatus according to mode 1, wherein the hammering tester hammer part error signal generator comprises:
 a distance sensor provided at a remote end of the hammering tester hammer part, detecting a distance between the remote end of the hammering tester hammer part and a surface of a hammering object and generating a distance sensor signal from the detected distance,
 a force sensor provided in the hammering tester hammer part, detecting force information applied to the hammering tester hammer part and generating a force sensor signal from the detected force information, and
 a remote end part position/attitude sensor provided in the hammering tester hammer part, to detect position/attitude information of the hammering tester hammer part and generate a remote end part position/attitude sensor signal from the detected position/attitude information,
 wherein the hammering tester hammer part error signal is generated from the distance sensor signal, the force sensor signal and the remote end part position/attitude sensor signal.

[Mode 3]

The inspection apparatus according to mode 1 or 2, wherein
 the hammering tester hammer part position/attitude signal generator comprises:
 a linear motion part displacement sensor provided in a linear motion part of the hammering tester arm, detecting displacement information of the linear motion part and generating a linear motion part displacement sensor signal from the detected displacement information,
 a remote end part angle sensor provided in a remote end part angle driving part of the hammering tester arm, detecting remote end part angle information and generating a remote end part angle sensor signal from the detected remote end part angle information, and
 an arm part angle sensor provided in an arm part angle driving part of the hammering tester arm, detecting arm part angle information and generating an arm part angle sensor signal from the detected arm part angle information, wherein the hammering tester hammer part position/attitude signal is generated from the linear motion part displacement sensor signal, the remote end part angle sensor signal and the arm part angle sensor signal.

[Mode 4]

The inspection apparatus according to any one of modes 1 to 3, wherein the first sensor data frequency characteristic interpolator is so configured as to generate the first sensor data frequency characteristic interpolation signal by applying, to the chassis position/attitude estimation signal, a combination of a weighting processing which takes account of a frequency characteristic of a control system for position and attitude of the moving body and an interpolation processing between sampling frequencies.

[Mode 5]

The inspection apparatus according to any one of modes 1 to 4, wherein the second sensor data frequency characteristic interpolator is so configured as to generate the second sensor data frequency characteristic interpolation signal by applying, to the hammering tester hammer part error signal and the hammering tester hammer part position/attitude signal, a combination of a weighting processing which takes account of a frequency characteristic of a control system for the linear motion part, the remote end part and the arm part of the hammering tester arm and an interpolation processing between sampling frequencies.

[Mode 6]

The inspection apparatus according to any one of modes 1 to 5, wherein the hammering tester hammer part position/attitude estimator is so configured as to generate the hammering tester hammer part position/attitude estimation signal by performing a Kalman filter processing by using the first sensor data frequency characteristic interpolation signal as a propagation signal and the second sensor data frequency characteristic interpolation signal as an update signal.

[Mode 7]

The inspection apparatus according to any one of modes 1 to 6, comprising a chassis position/attitude driving command signal generator to receive the generated hammering tester hammer part position/attitude estimation signal and generate a chassis position/attitude driving command signal from the received hammering tester hammer part position/attitude estimation signal, a remote end part actuator command signal generator to receive the generated hammering tester hammer part position/attitude estimation signal and generate a remote end part actuator command signal from the received hammering tester hammer part position/attitude estimation signal, an arm part actuator command signal generator to receive the generated hammering tester hammer part position/attitude estimation signal and generate an arm part actuator command signal from the received hammering tester hammer part position/attitude estimation signal, and a linear motion part actuator command signal generator to receive the generated hammering tester hammer part position/attitude estimation signal and generate a linear motion part actuator command signal from the received hammering tester hammer part position/attitude estimation signal.

[Mode 8]

A method for controlling an inspection apparatus to inspect a state of an inspecting object, the apparatus comprising a hammering tester having a hammering tester arm and a hammering tester hammer part provided at a remote end of the hammering tester arm, and a moving body on which the hammering tester is mounted, the method comprising:

estimating position/attitude information of the moving body and generating a chassis position/attitude estimation signal, generating a hammering tester hammer part error signal, generating a hammering tester hammer part position/attitude signal, generating a first sensor data frequency characteristic interpolation signal from the generated chassis position/attitude estimation signal, generating a second sensor data frequency characteristic interpolation signal from the generated hammering tester hammer part error signal and the generated hammering tester hammer part position/attitude signal, and generating a hammering tester hammer part position/attitude estimation signal from the generated first sensor data frequency characteristic interpolation signal and the generated second sensor data frequency characteristic interpolation signal.

[Mode 9]

The control method according to mode 8, comprising:

detecting a distance between a remote end of the hammering tester hammer part and a surface of a hammering object and generating a distance sensor signal from the detected distance, detecting force information applied to the hammering tester hammer part and generating a force sensor signal from the detected force information, detecting position/attitude information of the hammering tester hammer part and generating a remote end part position/attitude sensor signal from the detected position/attitude information, and generating the hammering tester hammer part error signal from the distance sensor signal, the force sensor signal and the remote end part position/attitude sensor signal.

[Mode 10]

The control method according to mode 8 or 9, comprising:

detecting displacement information of a linear motion part of the hammering tester arm and generating a linear motion part displacement sensor signal from the detected displacement information, detecting remote end part angle information and generating a remote end part angle sensor signal from the detected remote end part angle information, detecting arm part angle information and generating an arm part angle sensor signal from the detected arm part angle information, and generating the hammering tester hammer part position/attitude signal from the linear motion part displacement sensor signal, the remote end part angle sensor signal and the arm part angle sensor signal.

[Mode 11]

The control method according to any one of modes 8 to 10, comprising:

generating the first sensor data frequency characteristic interpolation signal by applying, to the chassis position/ attitude estimation signal, a combination of a weighting processing which takes account of a frequency characteristic of a control system for position and attitude of the moving body, and an interpolation processing between sampling frequencies.

[Mode 12]

The control method according to any one of modes 8 to 11, comprising:

generating the second sensor data frequency characteristic interpolation signal by applying, to the hammering tester hammer part error signal and the hammering tester hammer part position/attitude signal, a combination of a weighting processing which takes account of a frequency characteristic of a control system for the linear motion part, the remote end part and the arm part of the hammering tester arm, and an interpolation processing between sampling frequencies.

[Mode 13]

The control method according to any one of modes 8 to 12, comprising:

generating the hammering tester hammer part position/attitude estimation signal by performing a Kalman filter processing by using the first sensor data frequency characteristic interpolation signal as a propagation signal and the second sensor data frequency characteristic interpolation signal as an update signal.

[Mode 14]

The control method according to any one of modes 8 to 13, comprising:

generating a chassis position/attitude driving command signal from the generated hammering tester hammer part position/attitude estimation signal, generating a remote end part actuator command signal from the generated hammering tester hammer part position/attitude estimation signal, generating an arm part actuator command signal from the generated hammering tester hammer part position/attitude estimation signal, and generating a linear motion part actuator command signal from the generated hammering tester hammer part position/attitude estimation signal, adjusting a position and/or an attitude of the chassis of the moving body based on the generated chassis position/attitude driving command signal, and adjusting a position and/or an attitude of the hammering tester hammer part based on the generated remote end part actuator command signal, the generated arm part actuator command signal and the generated linear motion part actuator command signal.

[Mode 15]

A computer readable non-transitory recording medium recording a program for controlling an inspection apparatus to inspect a state of an inspecting object, the apparatus comprising a hammering tester including a hammering tester arm and a hammering tester hammer part provided at a remote end of the hammering tester arm, and a moving body on which the hammering tester is mounted, the control program making a computer execute the following processing:

estimating position/attitude information of the moving body and generating a chassis position/attitude estimation signal, generating hammering tester hammer part error signal, generating a hammering tester hammer part position/attitude signal, generating a first sensor data frequency characteristic interpolation signal from the generated chassis position/attitude estimation signal, generating a second sensor data frequency characteristic interpolation signal from the generated hammering tester hammer part error signal and the generated hammering tester hammer part position/attitude signal, and generating a hammering tester hammer part position/attitude estimation signal from the generated first sensor data frequency characteristic interpolation signal and the generated second sensor data frequency characteristic interpolation signal.

[Mode 16]

The recording medium according to mode 15, making a computer execute the following processing:

detecting a distance between a remote end of the hammering tester hammer part and a surface of a hammering object and generating a distance sensor signal from the detected distance, detecting force information applied to the hammering tester hammer part and generating a force sensor signal from the detected force information, detecting position/attitude information of the hammering tester hammer part and generating a remote end part position/attitude sensor signal from the detected position/attitude information, and generating the hammering tester hammer part error signal from the distance sensor signal, the force sensor signal and the remote end part position/attitude sensor signal.

[Mode 17]

The recording medium according to mode 15 or 16, making a computer execute the following processing:

detecting displacement information of a linear motion part of the hammering tester arm and generating a linear motion part displacement sensor signal from the detected displacement information, detecting remote end part angle information and generating a remote end part angle sensor signal from the detected remote end part angle information, detecting arm part angle information and generating an arm part angle sensor signal from the detected arm part angle information, and generating the hammering tester hammer part position/attitude signal from the linear motion part displacement sensor signal, the remote end part angle sensor signal and the arm part angle sensor signal.

[Mode 18]

The recording medium according to any one of modes 15 to 17, making a computer execute the following processing:

generating the first sensor data frequency characteristic interpolation signal by applying, to the chassis position/attitude estimation signal, a combination of a weighting processing which takes account of a frequency characteristic of a control system for position and attitude of the moving body, and an interpolation processing between sampling frequencies.

[Mode 19]

The recording medium according to any one of modes 15 to 18, making a computer execute the following processing:

generating the second sensor data frequency characteristic interpolation signal by applying, to the hammering tester hammer part error signal and the hammering tester hammer part position/attitude signal, a combination of a weighting processing which takes account of a frequency characteristic of a control system for the linear motion part, the remote end part and the arm part of the hammering tester arm, and an interpolation processing between sampling frequencies.

[Mode 20]

The recording medium according to any one of modes 15 to 19,
making a computer execute the following processing:
generating the hammering tester hammer part position/attitude estimation signal by performing a Kalman filter processing by using the first sensor data frequency characteristic interpolation signal as a propagation signal and the second sensor data frequency characteristic interpolation signal as an update signal.

[Mode 21]

The recording medium according to any one of modes 15 to 20,
making a computer execute the following processing:
generating a chassis position/attitude driving command signal from the generated hammering tester hammer part position/attitude estimation signal,
generating a remote end part actuator command signal from the generated hammering tester hammer part position/attitude estimation signal,
generating an arm part actuator command signal from the generated hammering tester hammer part position/attitude estimation signal, and
generating a linear motion part actuator command signal from the generated hammering tester hammer part position/attitude estimation signal,
adjusting a position and/or an attitude of the chassis of the moving body based on the generated chassis position/attitude driving command signal, and
adjusting a position and/or an attitude of the hammering tester hammer part based on the generated remote end part actuator command signal, the generated arm part actuator command signal and the generated linear motion part actuator command signal.

[Mode 22]

An inspection apparatus for inspecting a state of an inspecting object, comprising
a hammering tester and a moving body on which the hammering tester is mounted,
the hammering tester comprising a hammering tester arm and a hammering tester hammer part provided at a remote end of the hammering tester arm,
the inspection apparatus comprising:
means for estimating position/attitude information of the moving body and generating a chassis position/attitude estimation signal,
means for generating a hammering tester hammer part error signal,
means for generating a hammering tester hammer part position/attitude signal,
means for receiving the generated chassis position/attitude estimation signal and generating a first sensor data frequency characteristic interpolation signal from the received chassis position/attitude estimation signal,
means for receiving the generated hammering tester hammer part error signal and the generated hammering tester hammer part position/attitude signal and generating a second sensor data frequency characteristic interpolation signal from the received hammering tester hammer part error signal and the received hammering tester hammer part position/attitude signal, and
means for receiving the generated first sensor data frequency characteristic interpolation signal and the generated second sensor data frequency characteristic interpolation signal and generating a hammering tester hammer part position/attitude estimation signal from the received first sensor data frequency characteristic interpolation signal and the received second sensor data frequency characteristic interpolation signal.

[Mode 23]

The inspection apparatus according to mode 22, wherein the means for generating a hammering tester hammer part error signal comprises:
means for detecting a distance between a remote end of the hammering tester hammer part and a surface of a hammering object and generating a distance sensor signal from the detected distance,
means for detecting force information applied to the hammering tester hammer part and generating a force sensor signal from the detected force information, and
means for detecting position/attitude information of the hammering tester hammer part and generating a remote end part position/attitude sensor signal from the detected position/attitude information,
wherein the hammering tester hammer part error signal is generated from the distance sensor signal, the force sensor signal and the remote end part position/attitude sensor signal.

[Mode 24]

The inspection apparatus according to mode 22 or 23, wherein the means for generating a hammering tester hammer part position/attitude signal comprises:
means for detecting displacement information of a linear motion part of the hammering tester arm, and generating a linear motion part displacement sensor signal from the detected displacement information,
means for detecting remote end part angle information, and generating a remote end part angle sensor signal from the detected remote end part angle information, and
means for detecting arm part angle information, and generating an arm part angle sensor signal from the detected arm part angle information,
wherein the hammering tester hammer part position/attitude signal is generated from the linear motion part displacement sensor signal, the remote end part angle sensor signal and the arm part angle sensor signal.

[Mode 25]

The inspection apparatus according to any one of modes 22 to 24, wherein
the means for generating a first sensor data frequency characteristic interpolation signal generates the first sensor data frequency characteristic interpolation signal by applying, to the chassis position/attitude estimation signal, a combination of a weighting processing which takes account of a frequency characteristic of a control system for position and attitude of the moving body, and an interpolation processing between sampling frequencies.

[Mode 26]

The inspection apparatus according to any one of modes 22 to 25, wherein
the means for generating a second sensor data frequency characteristic interpolation signal generates the second sensor data frequency characteristic interpolation signal by applying, to the hammering tester hammer part error signal and the hammering tester hammer part position/attitude signal, a combination of a weighting processing which takes account of a frequency characteristic of a control system for the linear motion part, the remote end part and the arm part of the hammering tester arm, and an interpolation processing between sampling frequencies.

[Mode 27]

The inspection apparatus according to any one of modes 22 to 26, wherein the means for generating a hammering tester hammer part position/attitude estimation signal generates the hammering tester hammer part position/attitude estimation signal by performing a Kalman filter processing by using the first sensor data frequency characteristic interpolation signal as a propagation signal and the second sensor data frequency characteristic interpolation signal as an update signal.

[Mode 28]

The inspection apparatus according to any one of modes 22 to 27, comprising:

means for receiving the generated hammering tester hammer part position/attitude estimation signal and generating a chassis position/attitude driving command signal from the received hammering tester hammer part position/attitude estimation signal, means for receiving the generated hammering tester hammer part position/attitude estimation signal and generating a remote end part actuator command signal from the received hammering tester hammer part position/attitude estimation signal, means for receiving the generated hammering tester hammer part position/attitude estimation signal and generating an arm part actuator command signal from the received hammering tester hammer part position/attitude estimation signal, means for receiving the generated hammering tester hammer part position/attitude estimation signal and generating a linear motion part actuator command signal from the received hammering tester hammer part position/attitude estimation signal, and means for adjusting a position and/or an attitude of the chassis of the moving body based on the generated chassis position/attitude driving command signal, wherein a remote end part actuator has means for receiving the generated remote end part actuator command signal, an arm part actuator has means for receiving the generated arm part actuator command signal, and a linear motion part actuator has means for receiving the generated linear motion part actuator command signal.

[Mode 29]

An inspection system, comprising an inspection apparatus according to any one of modes 1 to 7, 22 to 28, and a communication apparatus which communicates the inspection apparatus by wire or wireless.

The disclosure of each of the above-mentioned patent literatures is incorporated herein by reference thereto.

It is to be noted that it is possible to modify or adjust the example embodiments within the whole disclosure of the present invention (including the Claims and the Drawings) and based on the basic technical concept thereof. Further, it is possible to variously combine or select a wide variety of the disclosed elements (including the individual elements of the individual claims, the individual elements of the individual embodiments and the individual elements of the individual figures) within the scope of the Claims of the present invention. That is, it is self-explanatory that the present invention includes any types of variations and modifications to be done by a skilled person according to the whole disclosure including the Claims and the Drawings and the technical concept of the present invention.

REFERENCE SIGNS LIST

1 chassis position/attitude estimator
2 hammering tester hammer part error signal generator
3 hammering tester hammer part position/attitude signal generator
4 first sensor data frequency characteristic interpolator
5 second sensor data frequency characteristic interpolator
6 hammering tester hammer part position/attitude estimator
7 distance sensor
8 force sensor
9 remote end part position/attitude sensor
10 linear motion part angle sensor
11 remote end part angle sensor
12 arm part angle sensor
13 chassis position/attitude driving command signal generator
14 remote end part actuator command signal generator
15 arm part actuator command signal generator
16 linear part actuator command signal generator
20 chassis position/attitude estimation signal
21 hammering tester hammer part error signal
22 hammering tester hammer part position/attitude signal
23 first sensor data frequency characteristic interpolation signal
24 second sensor data frequency characteristic interpolation signal
25 hammering tester hammer part position/attitude estimation signal
26 distance sensor signal
27 force sensor signal
28 remote end part position/attitude sensor signal
29 linear motion part displacement sensor signal
30 remote end part angle sensor signal
31 arm part angle sensor signal
100 moving body (vehicle)
101 hammering tester
102 hammering tester arm
103 hammering tester hammer part

The invention claimed is:

1. An inspection apparatus for inspecting a state of an inspecting object, the inspection apparatus comprising:
    a hammering tester; and
    a moving body on which the hammering tester is mounted,
    wherein the hammering tester comprises:
        a hammering tester arm; and
        a hammering tester hammer part provided at a remote end of the hammering tester arm, and
    wherein the inspection apparatus comprises:
        a chassis position/attitude estimator configured to estimate position/attitude information of the moving body and generate a chassis position/attitude estimation signal;
        a hammering tester hammer part distance-based error signal generator configured to generate a hammering tester hammer part distance-based error signal based on a distance between a remote end of the hammering tester hammer part and a surface of the inspecting object;
        a hammering tester hammer part position/attitude signal generator configured to generate a hammering tester hammer part position/attitude signal;

a first sensor data frequency characteristic interpolator configured to receive the generated chassis position/attitude estimation signal and generate a first sensor data frequency characteristic interpolation signal from the received chassis position/attitude estimation signal;

a second sensor data frequency characteristic interpolator configured to receive the generated hammering tester hammer part distance-based error signal and the generated hammering tester hammer part position/attitude signal and generate a second sensor data frequency characteristic interpolation signal from the received hammering tester hammer part distance-based error signal and the received hammering tester hammer part position/attitude signal; and a hammering tester hammer part position/attitude estimator configured to receive the generated first sensor data frequency characteristic interpolation signal and the generated second sensor data frequency characteristic interpolation signal and generate a hammering tester hammer part position/attitude estimation signal from the received first sensor data frequency characteristic interpolation signal and the received second sensor data frequency characteristic interpolation signal.

2. The inspection apparatus according to claim 1, wherein the hammering tester hammer part distance-based error signal generator comprises:

a distance sensor provided at the remote end of the hammering tester hammer part, configured to detect the distance between the remote end of the hammering tester hammer part and the surface of the inspecting object and generate a distance sensor signal from the detected distance;

a force sensor provided in the hammering tester hammer part, configured to detect force information applied to the hammering tester hammer part and generate a force sensor signal from the detected force information; and a remote end part position/attitude sensor provided in the hammering tester hammer part, configured to detect position/attitude information of the hammering tester hammer part and generate a remote end part position/attitude sensor signal from the detected position/attitude information, wherein the hammering tester hammer part distance-based error signal is generated from a combination of the distance sensor signal, the force sensor signal and the remote end part position/attitude sensor signal.

3. The inspection apparatus according to claim 1, wherein the hammering tester hammer part position/attitude signal generator comprises:

a linear motion part displacement sensor provided in a linear motion part of the hammering tester arm, wherein the linear motion part displacement sensor is configured to detect displacement information of the linear motion part and generate a linear motion part displacement sensor signal from the detected displacement information;

a remote end part angle sensor provided in a remote end part angle driving part of the hammering tester arm, configured to detect remote end part angle information and generate a remote end part angle sensor signal from the detected remote end part angle information; and an arm part angle sensor provided in an arm part angle driving part of the hammering tester arm, configured to detect arm part angle information and generate an arm part angle sensor signal from the detected arm part angle information, wherein the hammering tester hammer part position/attitude signal is generated from a combination of the linear motion part displacement sensor signal, the remote end part angle sensor signal and the arm part angle sensor signal.

4. The inspection apparatus according to claim 1, wherein the first sensor data frequency characteristic interpolator is configured to generate the first sensor data frequency characteristic interpolation signal by applying, to the chassis position/attitude estimation signal, a combination of a weighting processing which takes account of a frequency characteristic of a control system for position and attitude of the moving body, and an interpolation processing between sampling frequencies.

5. The inspection apparatus according to claim 1, wherein the second sensor data frequency characteristic interpolator is configured to generate the second sensor data frequency characteristic interpolation signal by applying, to the hammering tester hammer part distance-based error signal and the hammering tester hammer part position/attitude signal, a combination of a weighting processing which takes account of a frequency characteristic of a control system for a linear motion part, the remote end part and an arm part of the hammering tester arm, and an interpolation processing between sampling frequencies.

6. The inspection apparatus according to claim 1, wherein the hammering tester hammer part position/attitude estimator is configured to generate the hammering tester hammer part position/attitude estimation signal by performing a Kalman filter processing by using the first sensor data frequency characteristic interpolation signal as a propagation signal and the second sensor data frequency characteristic interpolation signal as an update signal.

7. The inspection apparatus according to claim 1, comprising:

a chassis position/attitude driving command signal generator configured to receive the generated hammering tester hammer part position/attitude estimation signal and generate a chassis position/attitude driving command signal from the received hammering tester hammer part position/attitude estimation signal;

a remote end part actuator command signal generator configured to receive the generated hammering tester hammer part position/attitude estimation signal and generate a remote end part actuator command signal from the received hammering tester hammer part position/attitude estimation signal;

an arm part actuator command signal generator configured to receive the generated hammering tester hammer part position/attitude estimation signal and generate an arm part actuator command signal from the received hammering tester hammer part position/attitude estimation signal; and a linear motion part actuator command signal generator configured to receive the generated hammering tester hammer part position/attitude estimation signal and generate a linear motion part actuator command signal from the received hammering tester hammer part position/attitude estimation signal.

8. An inspection system, an inspection apparatus according to claim 1; and a communication apparatus configured to communicate with the inspection apparatus by wire or wireless.

9. A method for controlling an inspection apparatus to inspect a state of an inspecting object, the apparatus comprising a hammering tester having a hammering tester arm and a hammering tester hammer part provided at a remote end of the hammering tester arm, and a moving body on which the hammering tester is mounted, the method comprising:
- estimating position/attitude information of the moving body and generating a chassis position/attitude estimation signal;
- generating a hammering tester hammer part distance-based error signal based on a distance between a remote end of the hammering tester hammer part and a surface of the inspecting object;
- generating a hammering tester hammer part position/attitude signal;
- generating a first sensor data frequency characteristic interpolation signal from the generated chassis position/attitude estimation signal;
- generating a second sensor data frequency characteristic interpolation signal from the generated hammering tester hammer part distance-based error signal and the generated hammering tester hammer part position/attitude signal; and
- generating a hammering tester hammer part position/attitude estimation signal from the generated first sensor data frequency characteristic interpolation signal and the generated second sensor data frequency characteristic interpolation signal.

10. The method according to claim 9, comprising:
- detecting the distance between the remote end of the hammering tester hammer part and the surface of the inspecting object;
- generating a distance sensor signal from the detected distance;
- detecting force information applied to the hammering tester hammer part and generating a force sensor signal from the detected force information;
- detecting position/attitude information of the hammering tester hammer part and generating a remote end part position/attitude sensor signal from the detected position/attitude information; and
- generating the hammering tester hammer part distance-based error signal from a combination of the distance sensor signal, the force sensor signal and the remote end part position/attitude sensor signal.

11. The method according to claim 9, comprising:
- detecting displacement information of a linear motion part of the hammering tester arm, and generating a linear motion part displacement sensor signal from the detected displacement information;
- detecting remote end part angle information, and generating a remote end part angle sensor signal from the detected remote end part angle information;
- detecting arm part angle information, and generating an arm part angle sensor signal from the detected arm part angle information; and
- generating the hammering tester hammer part position/attitude signal from the linear motion part displacement sensor signal, the remote end part angle sensor signal and the arm part angle sensor signal.

12. The method according to claim 9, comprising:
- generating the first sensor data frequency characteristic interpolation signal by applying, to the chassis position/attitude estimation signal, a combination of a weighting processing which takes account of a frequency characteristic of a control system for position and attitude of the moving body, and an interpolation processing between sampling frequencies.

13. The method according to claim 9, comprising:
- generating the second sensor data frequency characteristic interpolation signal by applying, to the hammering tester hammer part distance-based error signal and the hammering tester hammer part position/attitude signal, a combination of a weighting processing which takes account of a frequency characteristic of a control system for a linear motion part, the remote end part and an arm part of the hammering tester arm, and an interpolation processing between sampling frequencies.

14. The method according to claim 9, comprising:
- generating the hammering tester hammer part position/attitude estimation signal by performing a Kalman filter processing by using the first sensor data frequency characteristic interpolation signal as a propagation signal and the second sensor data frequency characteristic interpolation signal as an update signal.

15. The method according to claim 9, comprising:
- generating a chassis position/attitude driving command signal from the generated hammering tester hammer part position/attitude estimation signal;
- generating a remote end part actuator command signal from the generated hammering tester hammer part position/attitude estimation signal;
- generating an arm part actuator command signal from the generated hammering tester hammer part position/attitude estimation signal;
- generating a linear motion part actuator command signal from the generated hammering tester hammer part position/attitude estimation signal;
- adjusting a position and/or an attitude of the chassis of the moving body based on the generated chassis position/attitude driving command signal; and
- adjusting a position and/or an attitude of the hammering tester hammer part based on the generated remote end part actuator command signal, the generated arm part actuator command signal and the generated linear motion part actuator command signal.

16. A computer readable non-transitory recording medium recording a program for controlling an inspection apparatus to inspect a state of an inspecting object, the apparatus comprising a hammering tester including a hammering tester arm and a hammering tester hammer part provided at a remote end of the hammering tester arm, and a moving body on which the hammering tester is mounted, wherein the control program, when executed, causes a computer to execute processing comprising:
- estimating position/attitude information of the moving body and generating a chassis position/attitude estimation signal;
- generating a hammering tester hammer part distance-based error signal based on a distance between a remote end of the hammering tester hammer part and a surface of the inspecting object;
- generating a hammering tester hammer part position/attitude signal;
- generating a first sensor data frequency characteristic interpolation signal from the generated chassis position/attitude estimation signal;
- generating a second sensor data frequency characteristic interpolation signal from the generated hammering tester hammer part distance-based error signal and the generated hammering tester hammer part position/attitude signal; and generating a hammering tester hammer part position/attitude estimation signal from the generated first sensor data frequency characteristic interpolation signal and the generated second sensor data frequency characteristic interpolation signal.

17. The recording medium according to claim 16, further recording a control program that, when executed, causes the computer to execute processing comprising:
- detecting the distance between the remote end of the hammering tester hammer part and the surface of the inspecting object and generating a distance sensor signal from the detected distance;
- detecting force information applied to the hammering tester hammer part and generating a force sensor signal from the detected force information;
- detecting position/attitude information of the hammering tester hammer part and generating a remote end part position/attitude sensor signal from the detected position/attitude information; and
- generating the hammering tester hammer part distance-based error signal from a combination of the distance sensor signal, the force sensor signal and the remote end part position/attitude sensor signal.

18. The recording medium according to claim 16, further recording a control program that, when executed, causes the computer to execute processing comprising:
- detecting displacement information of a linear motion part of the hammering tester arm and generating a linear motion part displacement sensor signal from the detected displacement information;
- detecting remote end part angle information and generating a remote end part angle sensor signal from the detected remote end part angle information;
- detecting arm part angle information and generating an arm part angle sensor signal from the detected arm part angle information; and
- generating the hammering tester hammer part position/attitude signal from the linear motion part displacement sensor signal, the remote end part angle sensor signal and the arm part angle sensor signal.

19. The recording medium according to claim 16, further recording a control program that, when executed, causes the computer to execute processing comprising:
- generating the first sensor data frequency characteristic interpolation signal by applying, to the chassis position/attitude estimation signal, a combination of a weighting processing which takes account of a frequency characteristic of a control system for position and attitude of the moving body, and an interpolation processing between sampling frequencies;
- generating the second sensor data frequency characteristic interpolation signal by applying, to the hammering tester hammer part distance-based error signal and the hammering tester hammer part position/attitude signal, a combination of a weighting processing which takes account of a frequency characteristic of a control system for a linear motion part, the remote end part and an arm part of the hammering tester arm, and an interpolation processing between sampling frequencies; and
- generating the hammering tester hammer part position/attitude estimation signal by performing a Kalman filter processing by using the first sensor data frequency characteristic interpolation signal as a propagation signal and the second sensor data frequency characteristic interpolation signal as an update signal.

20. The recording medium according to claim 16, further recording a control program that, when executed, causes the computer to execute processing comprising:
- generating a chassis position/attitude driving command signal from the generated hammering tester hammer part position/attitude estimation signal;
- generating a remote end part actuator command signal from the generated hammering tester hammer part position/attitude estimation signal;
- generating an arm part actuator command signal from the generated hammering tester hammer part position/attitude estimation signal;
- generating a linear motion part actuator command signal from the generated hammering tester hammer part position/attitude estimation signal;
- adjusting a position and/or an attitude of the chassis of the moving body based on the generated chassis position/attitude driving command signal; and
- adjusting a position and/or an attitude of the hammering tester hammer part based on the generated remote end part actuator command signal, the generated arm part actuator command signal and the generated linear motion part actuator command signal.

\* \* \* \* \*